Figure 1:
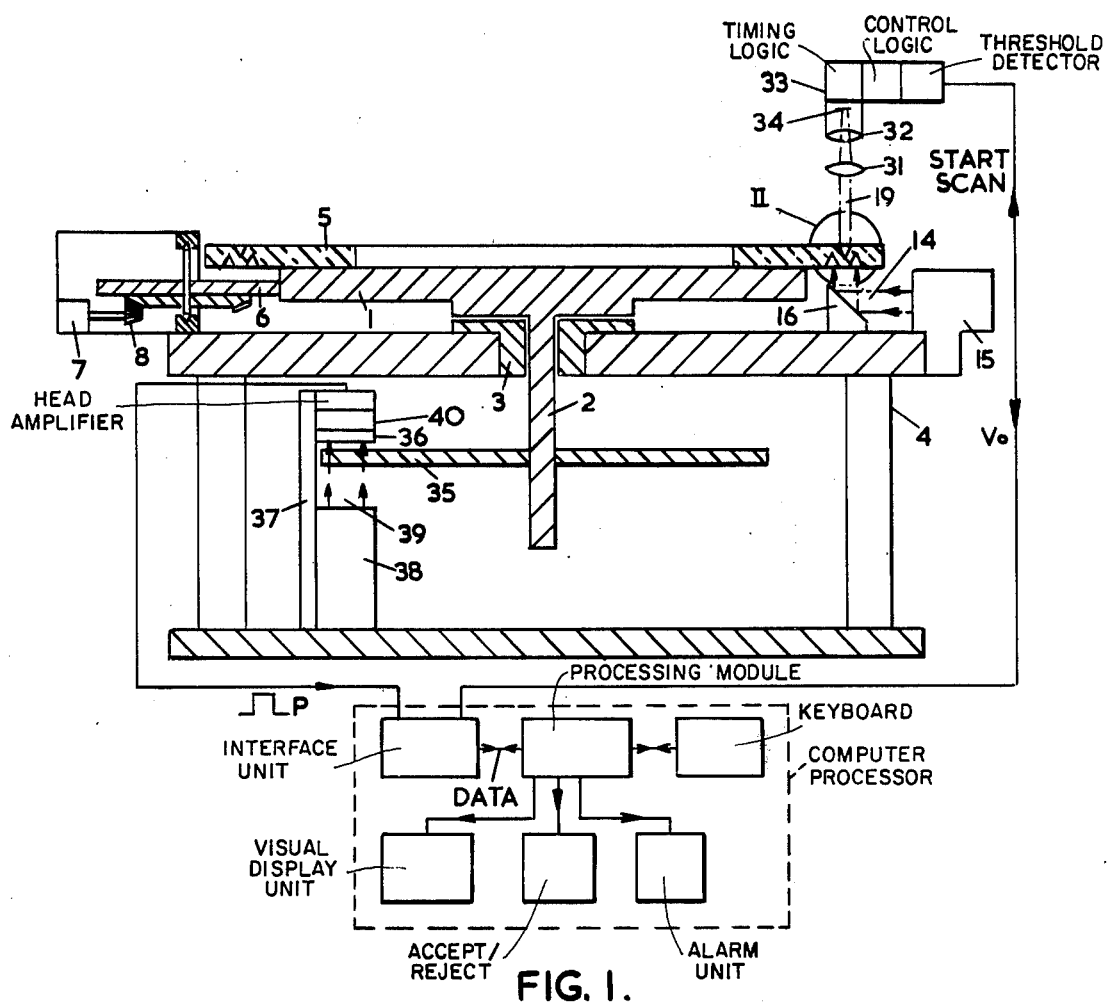

United States Patent [19]

Bell et al.

[11] 4,117,539

[45] Sep. 26, 1978

[54] AUTOMATIC INSPECTION OF MACHINED PARTS

[75] Inventors: Donald Atkinson Bell, Teddington; Bernard John Chorley, Whitton; John Ronald Parks, West Byfleet; Robert Lewis Wanek, London, all of England

[73] Assignee: The Secretary of State for Industry in Her Britannic Majesty's Government of the United Kingdom of Great Britain and Northern Ireland, London, England

[21] Appl. No.: 695,151

[22] Filed: Jun. 11, 1976

[30] Foreign Application Priority Data

Jun. 12, 1975 [GB] United Kingdom ............... 25273/75

[51] Int. Cl.² .................... G06F 15/00; G01N 21/32
[52] U.S. Cl. .................................... 364/551; 356/196; 356/239; 364/468; 364/507; 364/525
[58] Field of Search ............... 235/151.3; 356/237, 356/239, 196; 358/106, 199–208; 178/DIG. 37; 364/468, 474, 507, 550, 551, 552, 525, 514, 469, 111; 250/562, 572; 340/213 R, 213 Q

[56] References Cited

U.S. PATENT DOCUMENTS

| 3,563,665 | 2/1971 | Takahashi et al. | 356/237 |
| 3,781,467 | 12/1973 | Soames | 356/237 |
| 3,791,741 | 2/1974 | Brenholdt | 356/237 |
| 3,826,578 | 7/1974 | King et al. | 356/237 |
| 3,908,078 | 9/1975 | Averbach et al. | 235/151.3 |
| 3,980,870 | 9/1976 | Kawahara | 235/151.3 |
| 3,981,184 | 9/1976 | Matay | 364/552 |
| 4,005,281 | 1/1977 | Faulhaber et al. | 235/151.3 |

OTHER PUBLICATIONS

Jensen et al.; Computerized Profile Analysis – IBM Tech. Discl. Bulletin, vol. 14, No. 8 – Jan. 1972 p. 2492.

Primary Examiner—Malcolm A. Morrison
Assistant Examiner—Errol A. Krass
Attorney, Agent, or Firm—Cushman, Darby & Cushman

[57] ABSTRACT

The apparatus includes a scanning system for scanning a projected image of an axially symmetric component's profile in a plurality of lines of scan, each line of scan being transverse to the axis of symmetry of the components profile and having a predetermined spatial relationship with respect to a neighboring line of scan. The scanning system may include a linear or two dimensional array of image detectors and the system produces electrical signals representative of the extent of the image of the component's profile along each line of scan for processing by a computer which uses these signals to calculate at least one of the parameters of length, breadth and curvature of the axis of at least a portion of the component and determines whether the parameter lies within a predetermined range.

10 Claims, 8 Drawing Figures

AUTOMATIC INSPECTION OF MACHINED PARTS

This invention relates to the automatic inspection of machine parts, manufactured articles and components.

The invention is particularly concerned with the automatic inspection of components which are produced in moderate or large quantities. Hitherto, it has been usual to inspect such components by statistical sampling methods which have ensured that between about 98% and 99% of the components satisfy the necessary requirements of size and quality. Quality control of this level may be adequate for components which are to be handled and assembled manually, but a higher degree of control is extremely desirable, and possibly necessary for components which are to be handled and assembled automatically. Such a higher degree of control can only be effected satisfactorily by inspecting each of the components, and the present invention is concerned with one possible apparatus and method of operation whereby this may be done.

According to the present invention, there is provided Apparatus for the automatic inspection of an axially symmetric component's profile comprising a scanning system for scanning in a plurality of lines of scan a projected image of the component, each line of scan being transverse to the axis of symmetry of the component's profile and having a predetermined spatial relationship with respect to a neighboring line of scan, the scanning system being arranged for producing electrical signals representative of the extent of the image of the component's profile along each line of scan, and a computer responsive to said electrical signals for calculating at least one of the parameters of length, breadth and curvature of the axis of at least a portion of the component and arranged for determining whether the parameter lies within a predetermined range.

Preferably the component consists of one or more segments axially conjoined to form a whole, wherein each segment may be a cylinder, or a right circular cone, or a right circular conical frustum, or a solid of revolution having a longitudinal surface which is generated by the revolution of a curve about the given axis of symmetry, the ends of the curve describing circles having their centers coincident with the given axis, and wherein the axis of symmetry of each segment is coincident with the given axis. A segment of the component may be a separable or integral portion of the component. The axis of symmetry of the component may be straight or curved. In either case apparatus according to this invention may calculate the length and/or breadth of segments of the component. The apparatus may also calculate the curvature of the axis of symmetry.

In a first embodiment of the invention, the scanning system comprises means which projects an image of at least a substantial portion of the component onto a two-dimensional scanning array — e.g. a vidicon tube — which can scan the image, the component being held stationary with respect to the scanning system during scanning of the image. If the two-dimensional scanning array is not sufficiently extensive to allow all of the component to be scanned in one operation, several scanning operations may be carried out sequentially on adjoining or overlapping portions of the component, a predetermined amount of relative movement being provided between the component, or projected image thereof, and the scanning array after each scanning operation.

However, in a second and preferred embodiment of the invention, the scanning system comprises means which projects an image of at least part of the component onto a one-dimensional scanning array — e.g. a linear solid-state photodiode array — and relative movement, which may be either incremental or continuous, is provided in a controlled manner between the component and the scanning array so that the scanning array can perform the plurality of lines of scan transverse to the axis of symmetry, as hereinbefore defined.

Preferably the scanning array is fixed and the component is moved — e.g. on a moving belt or on a turntable — along a path which is transverse to the scanning array. The path may be linear, but in a preferred embodiment of the invention the path is circular. In such a preferred embodiment the scanning system records a slightly distorted profile of the component and the computer incorporates means which correct for the distortion.

Preferably the computer is programmed to recognize each segment of the component, to calculate the parameters of length and breadth of the profile of each segment, and to determine whether each such parameter lies within an allowed range. Although the allowed range of parameter may be supplied to the computer in the form of data input — e.g. punched tape or keyboard input — preferably the computer is taught by arranging for the apparatus to scan a first master component of maximum allowed parameters and a second master component of minimum allowed parameters. The computer may be further programmed to calculate the curvature of the axis of symmetry. If the component should have a straight axis of symmetry the apparatus may determine whether the component is bent by programming the computer to calculate the position of the axis of each segment and to determine whether the segments share a common axis of symmetry.

The apparatus may incorporate means whereby any component having parameters all of which lie within the allowed ranges is diverted into an "accept" channel whilst any component having parameters one or more of which do not lie within the said allowed ranges is diverted in a "reject" channel.

Figure 2:
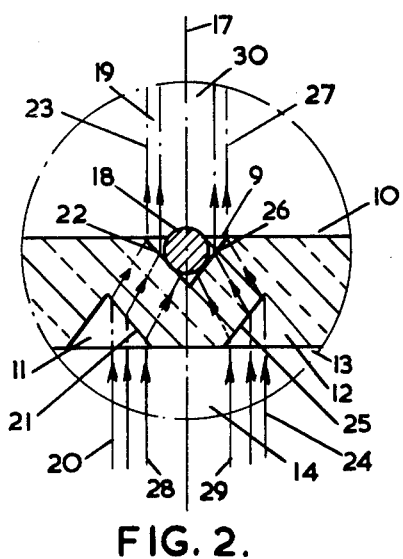
Figure 3:
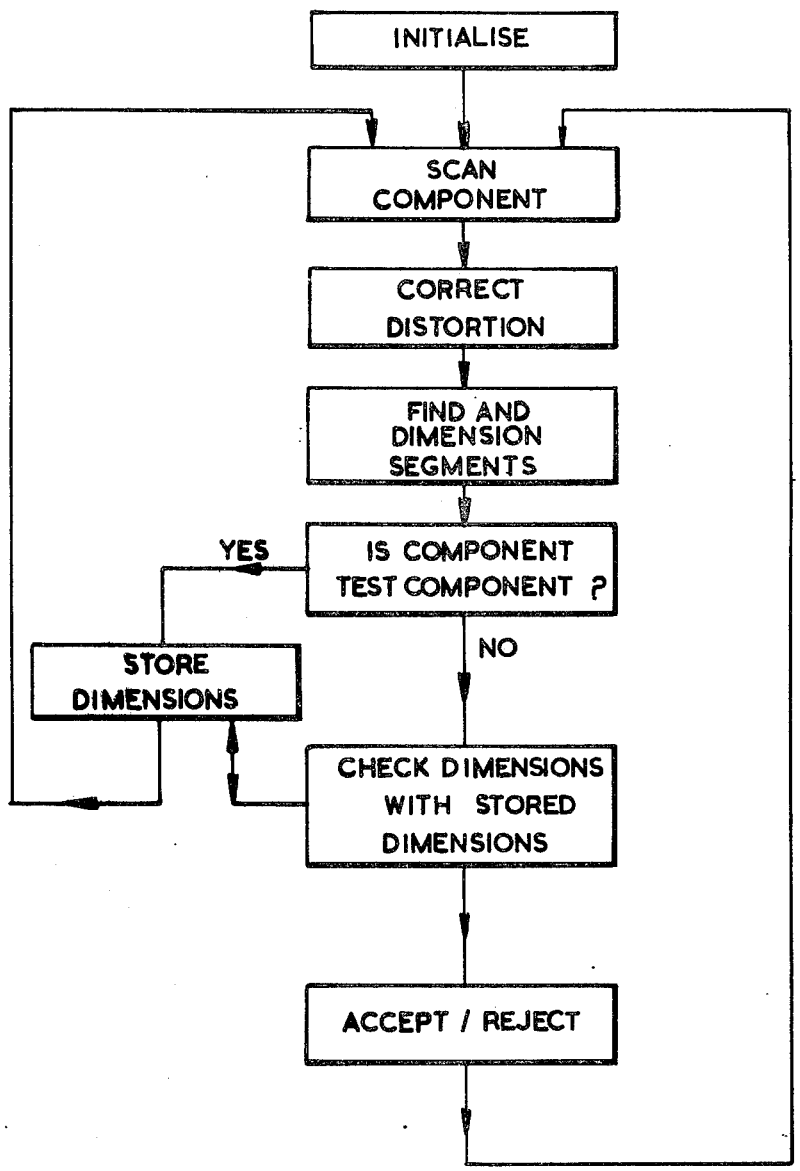
Figure 4:
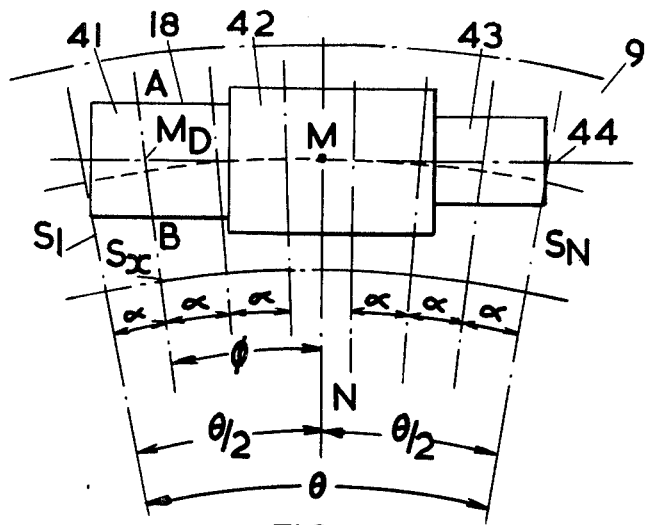
Figure 5:
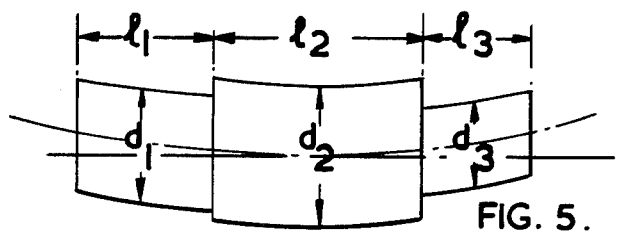
Figure 6:
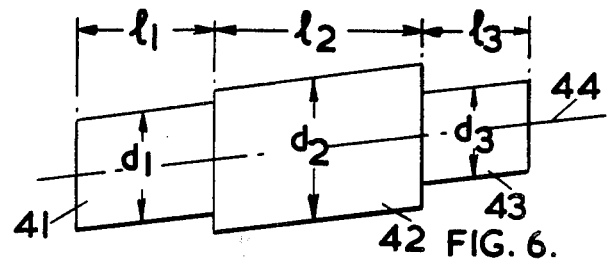
Figure 7:
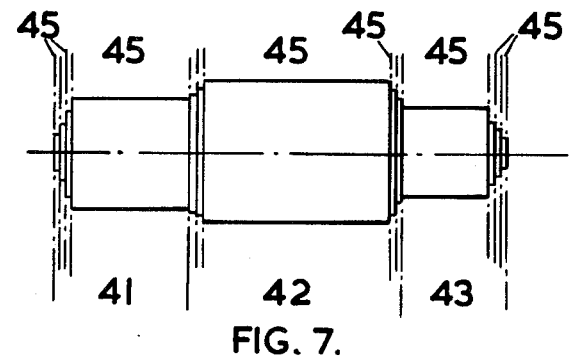
Figure 8:
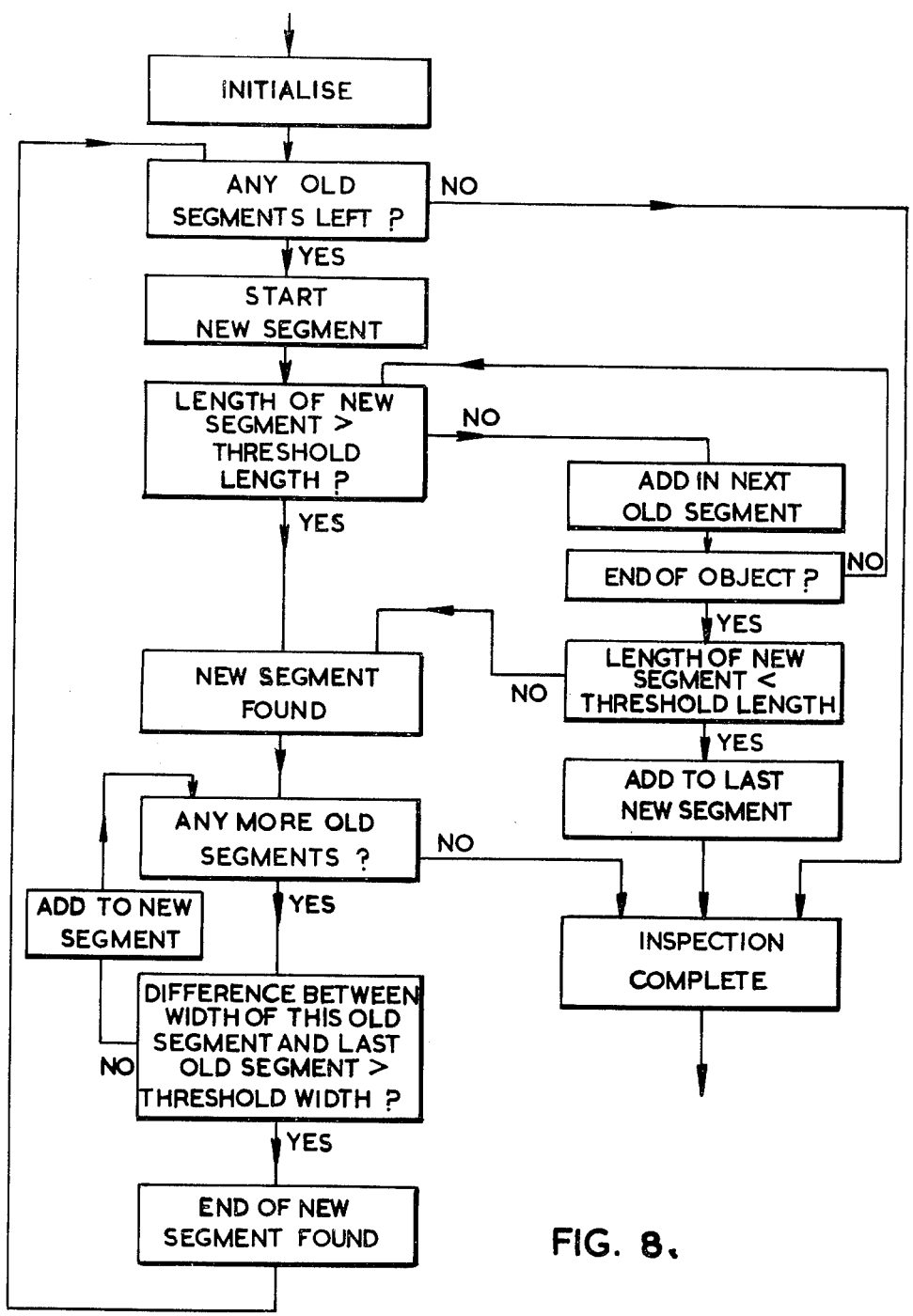

In order that the invention may be better understood, it will now be further described, by way of example only, with reference to the accompanying Figures:

FIG. 1 is a part-schematic, part-sectioned drawing of one embodiment of apparatus according to the invention for the automatic inspection of a component, FIG. 2 is an enlarged section of part of the apparatus shown at II in FIG. 1, FIG. 3 is a flow diagram illustrating the generalized method of operation of the apparatus of FIG. 1, FIG. 4 is an enlarged plan view of a component presented for inspection by the apparatus of FIG. 1, FIG. 5 is a distorted image of the component of FIG. 4 as detected by the apparatus of FIG. 1, FIG. 6 shows a partially corrected image of the distorted image of FIG. 5, FIG. 7 shows a first representation of the corrected image of the component of FIG. 4 as defined by the apparatus of FIG. 1, and FIG. 8 is a flow diagram which illustrates that portion of the method of operation of the apparatus of FIG. 1 which involves the identification and dimensioning of the component of FIG. 4.

In FIG. 1, the apparatus comprises a horizontal circular metal turntable 1 provided with a central spindle 2 which is free to rotate in a bush 3 mounted on a rigid table 4. The turntable 1 carries an annular transparent plate 5 of plastics material concentrically mounted thereon and is made to rotate by a friction drive wheel 6 powered by an induction motor 7 through a gear train 8.

The plate 5, whereof a part is shown in enlarged section in FIG. 2, is provided with a symmetrical V-shaped circular groove 9 in its upper surface 10 and two similar circular grooves 11 and 12 in its lower surface 13. A parallel beam of light 14, projected from a quartz halogen light source 15 fixed to the table 4, is reflected by a prism 16 vertically upwards through the plate 5 along an axis 17 which is arranged to pass through the centre of the V-shaped groove 9 contained in the upper surface 10 of the plate 5. The groove 9, which is provided to align a component 18 on the plate 5, and the grooves 11 and 12 are concentric with the spindle 2 of the turntable 1, and are arranged in combination so that a large portion of the beam 14 is transmitted through the plate 5 and emerges from the groove 9 as a parallel beam of light 19 along the axis 17. A ray 20 of the beam 14 which is externally incident on the outer wall 21 of the groove 11 is refracted through the plate 5 to be internally incident on the inner wall 22 of the groove 9, from which it emerges as a ray 23 of the beam 19. Similarly, a ray 24 of the beam 14 which is externally incident on the inner wall 25 of the groove 12 is refracted through plate 5 to be internally incident on the outer wall 26 of the groove 9, from which it emerges as a ray 27 of the beam 19. Rays 28 and 29 of the beam 14 which emerge from the groove 9 and are incident on the component 18 are scattered and do not form part of the beam 19, and the component 18 therefore casts a shadow 30 parallel to the axis 17.

The beam 19 is converged by a lens 31 onto the objective lens 32 of a Model LC 600 Single Line Scan Camera 33 — manufactured by the Reticon Corporation of Mountain View, Calif., USA — which comprises a linear photo-diode array 34, timing logic TL, control logic CL, and a threshold detector TD having an adjustable reference level. The lens 31 and the objective lens 32 co-operate to form a 5× magnified image of the shadow 30 of the component 18 on the photo-diode array 34. The array 34 consists of 512 photo-diodes of 0.001 inch aperture width set on 0.001 inch centres along a line which is parallel to the plane of the plate 5 and transverse to the groove 9 and the array 34 thus has a field of view of 0.1 inch transverse to the groove 9 and a resolution in this direction of 0.0002 inch.

A radial diffraction grating 35, of a conventional type, is rigidly attached to the spindle 2 of the turntable 1 and an adjacent index diffraction grating 36 is fixed to a bracket 37 mounted on the table 4. A light source 38 projects a collimated beam of light 39 through both the radial grating 35 and the index grating 36 onto a silicon photo-voltaic diode 40 mounted on the bracket 37 and electrically connected to a head amplifier HA. The radial grating 35 and the index grating 36 are so arranged that for each rotational movement of the turntable 1 equivalent to a movement of 0.001 inch of the component 18 with respect to the array 34, the intensity of the beam 39 is detected by the diode 40 passes through a null.

The head amplifier HA and the camera 33 are both connected to a computer processor CP comprising an interface unit IU and a processing module PM which can be manually controlled from a keyboard K and which can provide an output to a visual display unit VDU, an ACCEPT/REJECT facility AR, and an alarm unit AU.

In operation, the turntable 1 is driven at a speed of 2 rpm and the component 18 resting in the groove 9, which has a diameter of 10 inches, is transported through the beam 19 at a speed of approximately 1 inch per second. Each time that the diode 40 detects a null intensity of the beam 39 transmitted by the gratings 35 and 36, a pulse P is sent to the interface unit IU which relays a START SCAN signal to the camera 33. The timing logic TL arranges for the array 34 to be scanned sequentially to provide a serial video output signal VO to the threshold detector TD. This forms a binary video signal which is fed to the interface unit IU where it is converted to digital DATA defining the positions of the edges of the shadow 30 of the component 18 relative to the array 34. The DATA are processed by the processing module PM according to the flow diagram shown in FIG. 3.

Since the component 18 moves under the diode array 34 in a circular path, the DATA fed to the processing module PM represents a distorted image of the component 18 and a correction must be applied to create an image which is suitable for processing.

In FIG. 4, the component 18 located in the groove 9 is shown on a much enlarged scale to consist, as an example, of three axially conjoined cylindrical segments 41, 42, 43, having a common longitudinal axis 44. The segments 41, 42, 43, have respective lengths $l_1$, $l_2$, $l_3$, and diameters $d_1$, $d_2$, $d_3$, Superimposed on the diagram are a plurality of lines of scan $S_1$, $S_2$ ... $S_N$ carried out by the diode array 34, each pair of neighbouring lines of scan subtending an angle $\alpha$ at the centre of the turntable 1, $$\text{where } \alpha = \frac{\text{Length of arc of groove 9 between scans}}{\text{Mean radius R of groove 9.}} \text{ radians} \quad \text{Eq (1)}$$

Assuming that the component is short so that the length of the component can be assumed to be the length of the arc then the total angle $\theta$ subtended by the component 18 at the centre of the turn-table 1 is given by:

$$\theta = \frac{\text{Length of component 18}}{\text{Mean radius } R \text{ of groove 9}} \text{ radians} \quad \text{Eq (2)}$$

$$= \frac{l_1 + l_2 + l_3}{R} \text{ radians}$$

If it is assumed that the component 18 lies in the groove 9 so that the normal N to the longitudinal axis 44 intersects the axis 44 at its mid-point M, the first scan $S_1$ and the last scan $S_N$ each subtend an angle of $\theta/2$ with the normal N.

The scan $S_X$ is shown to intersect the component 18 at two points A and B and to be inclined at an angle $\phi$ to the normal N. The scan $S_x$ detects an apparent diameter $D_{APP}$ (= AB) of the component 18 which is given by:

$$D_{APP} = D_{TRUE} \sec \phi \quad \text{Eq (3)}$$

and which has a mid-point $M_D$ at a distance $R_{APP}$ from the centre of the turntable 1 given by:

$$R_{APP} = R \sec \phi \quad \text{Eq (4)}$$

It will be seen by a person skilled in the art that the maximum discrepancies between $D_{APP}$ and $D_{TRUE}$ and between $R_{APP}$ and $R$ occur for the first scan $S_1$ and the last scan $S_N$, when $\phi = \pm \theta/2$.

It is a feature of the invention that, by suitable design of the apparatus, the angle $\theta/2$ may be kept small, in which case $D_{APP}$ and $R_{APP}$ are given by the simplified equations:

$$D_{TRUE} = D_{APP}\left(1 - \frac{\phi^2}{2}\right) \qquad \text{Eq (5)}$$

$$R = R_{APP}\left(1 - \frac{\phi^2}{2}\right) \qquad \text{Eq (6)}$$

The apparatus herein described is suitable for checking a component which has an overall length of up to ⅛ inch and therefore, from equation (2):

$$\theta/2 \leq 1/20 \text{ radians}$$

and from Equations (5) and (6), for a component of length ⅛ inch $$D_{TRUE}(\text{Scan } S_1) = D_{APP}(\text{Scan } S_1)\left(1 - \frac{1}{800}\right)$$

$$R(\text{Scan } S_1) = R_{APP}(\text{Scan } S_1)\left(1 - \frac{1}{800}\right)$$

It will therefore be seen that moving the component 18 past the array 34 in a circular path causes the diameter of the component 18 to be misread by $\leq 0.125\%$ (which may be disregarded) and the longitudinal axis 44 of the component 18 to be distorted to a parabolic curve. Thus the diode array 34 sees the component 18 to be as shown in FIG. 5.

In order to correct for the distortion, it is assumed that the component 18 lies in the groove 9 so that the normal N which passes through the centre of the turntable, to the longitudinal axis 44 intersects the axis 44 at its mid-point M and the appropriate parabolic correction factor is applied to the DATA. If in fact the component 18 lies in such an attitude, the corrected DATA recreates the true shape and dimensions of the shadow 30. If, however, the component 18 lies at an angle to the abovementioned assumed attitude, and the same correction factor is applied, the corrected DATA represents the shadow 30 of the component 18 as shown in FIG. 6, wherein each segment 41, 42, 43, is distorted into a parallelogram having dimensions as illustrated. Similarly if the object is longer or shorter than expected then its true mid-point is not known until after the whole object has been scanned. However the correction is applied assuming that the mid-point is known. If it is estimated wrongly the object will appear as a parallelogram. This DATA is in a form suitable for processing.

It is a further feature of the invention that, once the DATA has been corrected as aforesaid, the processing module PM finds the lengths $l_1$, $l_2$, $l_3$, the diameters $d_1$, $d_2$, $d_3$, and the axes of the segments 41, 42, 43 of the component 18 according to the following procedure:

(i) The DATA relating to each line of scan are examined in turn. If the DATA for a line of scan indicates the presence of the shadow 30 of the component 18, then either (a) the width of the shadow 30 differs by more than a given threshold from the width of the shadow 30 detected by the previous line of scan and a different OLD SEGMENT is defined, or (b) the width of the shadow 30 does not differ by more than the given threshold from the width of the shadow 30 detected by the previous line of scan and the same OLD SEGMENT is incremented in length.

In this way, the processing module PM breaks down the shadow 30 of the component 18 into a plurality of OLD SEGMENTS, as shown as 45 in FIG. 7, which may be considerably more numerous than the segments 41, 42, 43 of the component 18 and which will take into account chamfers on the ends of the component 18 together with small machining irregularities along its length.

(ii) The processing module PM combines the OLD SEGMENTS to define and dimension NEW SEGMENTS using the process represented by the flowchart illustrated in FIG. 8. Each NEW SEGMENT corresponds to one of the physical segments 41, 42, 43 of the component 18.

The apparatus is adapted to examine a test component TEST (MAX) having the maximum allowed dimensions and a test component TEST (MIN) having the minimum allowed dimensions and to store the limiting allowed dimensions in response to instructions input to the keyboard K. The test components TEST (MAX) and TEST (MIN) are arranged to pass the array 34 with their corresponding segments in like orientation.

Production components to be tested are introduced into the groove 9 — e.g. by sliding them down a chute (not shown) — and may be aligned with their corresponding segments in either like or opposite orientation. The processing module PM defines and dimensions the NEW SEGMENTS of each component, checks each component to ensure that it is straight and that the parameters of length and breadth of each segment fall within the allowed limits stored within the processing module PM, and issues instructions to the ACCEPT-/REJECT mechanism accordingly. The ACCEPT-/REJECT mechanism conveniently incorporates two air-jets (not shown) which are controlled to direct the component into either an ACCEPT channel or a REJECT channel as appropriate.

The apparatus may be adapted to examine a component which is aligned with respect to the array at an angle substantially different from 90°. Furthermore, the apparatus may also be adapted to examine a component having a conical, or frusto-conical, segment of circular cross-section and such a segment may be conveniently defined by its length and the radius at each of its ends.

What we claim is:

1. Apparatus for the automatic inspection of an axially symmetric profile of a component comprising:
   a. a scanning system, including an image detecting array for scanning in a plurality of lines of scan a projected image of the profile of the component;
   b. a projection system for projecting an image of the component's profile onto a plane containing the array;
   c. a transparent member with means for supporting the component so that the component's projected image has an axis of symmetry which is transverse to the lines of scan;

d. motor means for causing relative movement between the projected image of the component and the array so that the array is caused to traverse the projected image; and e. a computer for receiving at predetermined intervals during the scanning of the projected image by the scanning system an electrical signal from the scanning system representative of the portions of a line, coincident with a line of scan, of the array which are occluded by the projected image and for calculating, using said electrical signals, at least one of the parameters of length, breadth and curvature of the axis of symmetry and for comparing the calculated value of the parameter with a predetermined value to determine whether the value is within a predetermined range.

2. Apparatus according to claim 1, in which the array is a two dimensional array.

3. Apparatus according to claim 1, in which the array is a linear array.

4. Apparatus according to claim 1, in which the transparent member is rotatably mounted and drivable by said motor means for moving the component in a substantially circular path relative to the array.

5. Apparatus according to claim 4, in which the computer includes correction means for removing parabolic distortion as seen by the scanning system of a rectilinear axis of symmetry of an image due to its arcuate motion relative to the array by shifting the phase of the signals received from the scanning system by an amount proportional to the position of the mid-point of the signal along said line and the angle subtended at the center of rotation of the transparent member by said line at the moment of scanning and a line fixed relative to the image of the component.

6. Apparatus according to claim 5, in which said line fixed relative to the image passes through the lengthwise mid point of the image.

7. Apparatus according to claim 4, in which the scanning system includes:

a. a circular grating rotatable with the transparent member;

b. a coating fixed grating;

c. a radiation source for directing a beam of radiation onto said gratings;

d. a radiation detector for detecting radiation from the source which has passed through the gratings so that when the transparent member is rotated by said motor means at a constant speed the radiation detected by the detector is periodically varied and its output is correspondingly varied; and e. means for deriving enabling signals from the output of the detector to enable the computer to receive said signals from the scanning system at said predetermined intervals.

8. Apparatus according to claim 1, in which the transparent member has a first groove for locating the component, and the projection system includes radiation means for directing a beam of radiation onto one side of the transparent member to project an image of the component when located in the first groove onto said array which is located on the other side of the transparent member.

9. Apparatus according to claim 8, in which the first groove is V-shaped and second and third similar V-shaped grooves equidistant from the first groove are provided in the opposite surface of the transparent member.

10. Apparatus according to claim 9, in which the transparent member is rotatably mounted and drivable by said motor means for moving the component in a substantially circular path relative to the array and in which the grooves are annular and concentric with the rotational center of the transparent member.

* * * * *